United States Patent [19]

Johnson

[11] 3,763,383

[45] Oct. 2, 1973

[54] DRIVE CIRCUIT FOR INDUCTIVE DEVICE

[75] Inventor: Harmon W. Johnson, San Jose, Calif.

[73] Assignee: International Business Machines Corporation, Armonk, N.Y.

[22] Filed: Aug. 21, 1972

[21] Appl. No.: 282,526

[52] U.S. Cl. ........... 307/270, 307/246, 340/174 TB, 317/148.5, 346/74 M

[51] Int. Cl. ........................................... H03k 3/53

[58] Field of Search ............................ 307/246, 270; 340/174 TB; 317/148.5; 346/74 M

[56] References Cited

UNITED STATES PATENTS

| | | | |
|---|---|---|---|
| 2,922,144 | 1/1960 | White et al. | 346/74 M |
| 3,125,759 | 3/1964 | Klein et al. | 346/74 M |
| 3,163,804 | 12/1964 | Cox | 317/148.5 |
| 3,344,321 | 9/1967 | Sumilas | 340/174 TB |
| 3,377,518 | 4/1968 | Radcliffe | 307/270 X |
| 3,555,525 | 1/1971 | Rothbart | 340/174 TB |
| 3,602,739 | 8/1971 | Pattantyus | 307/270 X |
| 3,618,119 | 11/1971 | Rodriguez | 346/74 M |
| 3,624,417 | 11/1971 | Dao | 307/270 |
| 3,714,543 | 1/1973 | Sahara et al. | 307/270 X |

*Primary Examiner*—John S. Heyman
*Attorney*—Nathan N. Kallman et al.

[57] ABSTRACT

A drive circuit has two circuit paths, each path including an inductive coil means to which a constant current source is applied; and a switching element that clamps the coil means to a fixed voltage.

9 Claims, 4 Drawing Figures

PRIOR ART

DRIVE CIRCUIT FOR INDUCTIVE DEVICE

1. BACKGROUND OF THE INVENTION

Field of the Invention

This invention relates to a drive circuit incorporating inductive elements, which may be used for electrical switching, and in particular to the use of an inductive switching circuit as a magnetic head driver.

2. Description of Prior Art

Inductive switching devices are used for various purposes, such as in drive circuits for magnetic recording heads, stepping motors, electrical switches, relays, and the like. As this invention is particularly applicable to magnetic head write drive circuitry, as employed in a magnetic recording apparatus, the description and explanation will be directed to embodiments of the invention in this type of circuit. However, it should be understood that the invention is not limited to such application only.

As is well known, magnetic heads are formed with an inductive coil wound to a magnetic core having a nonmagnetic transducing gap. In digital recording, one conventional approach is to utilize a center-tapped coil to which a bias voltage is applied, and a transistor circuit that serves as a current switch. To achieve magnetic recording, a sufficiently high current is needed for developing a suitable amount of flux or magnetization. Also, a relatively high bias voltage is needed to preclude driving the switch transistors into saturation during the inductive kick generated at turn-on time. Thus, the transistor circuit uses a high level of power that must be dissipated and requires heat sinks or other heat dissipating devices. This requirement seriously limits the degree of compactness with which the circuitry may be packaged, especially with regard to the distance at which it must be located from the head to be driven.

Known head drive circuits are generally made with two or three conductive wires connected to the head coil for conducting the signal to and from the head. Wires of any significant length add parasitic capacitance reducing switching speed, making the associated circuit more susceptible to spurious noise signals and transients that may introduce error to the data being processed, particularly with high frequency signals. Furthermore, the requirement for high-power dissipation sets a limitation on the switching speed of the transistors.

The trend in circuit technology generally is toward compactness and integrated structures with reduced power dissipation. Of course, improved reliability and lower cost are also goals to be achieved. It would be desirable to have a more compact, more reliable, higher bandwidth, and less expensive magnetic head drive circuit than now available.

SUMMARY OF THE INVENTION

An object of this invention is to provide a novel and improved inductive switching circuit.

Another object of this invention is to provide a drive circuit having low-power dissipation.

Another object of this invention is to provide a head write driver circuit configuration that may be made compactly and lends itself to an integrated circuit.

A further object is to provide a head drive circuit that is less susceptible to spurious noise.

A still further object is to provide a head drive circuit with higher bandwidth capabiltiy.

In an embodiment of this invention, a magnetic head drive circuit comprises a center-tapped inductive coil means, a first source of constant current applied to the center tap of said coil means, and circuit legs coupled to each end of said coil means, each leg including a switching element, so that one leg is energized while the other leg is deactivated.

A second constant current source is applied between said switching elements, the second current source being greater than the first current source. In this way, the power dissipation is transferred from the switches to the first current source, which may be located at some distance from the head without degradation of performance.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figure 1:
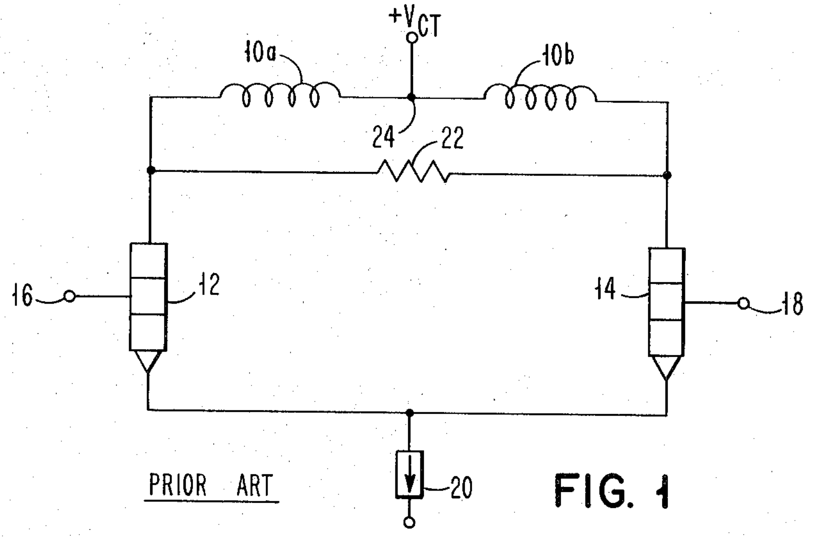
FIG. 1 is a schematic circuit diagram of a prior art current switching circuit.

With reference to FIG. 1 which illustrates a prior art, conventional current switch, a center-tapped inductive coil 10 is coupled at each end of its coil portions **10*a* and 10*b* to NPN transistors 12 and 14, respectively. PNP transistors may be used with like effect. The transistors serve as switching elements, responding to a trigger or flip-flop of a logic circuit (not shown), the trigger signals being applied alternately to the transistor bases at terminals 16 and 18**.

A constant current source 20 is connected between the emitters of the transistors. A damping resistor 22 is coupled between the ends of the coil 10 and the collectors of the transistors.

In the differential circuit of FIG. 1, a bias voltage $V_{CT}$ is applied to the center tap 24 of the coil 10. This bias voltage must be sufficiently high to prevent saturation of the transistors during the inductive kick that occurs when the transistors are switched on. By way of example, a bias voltage in the order of 10 volts, referenced between the head center tap and the emitter circuits of the transistors, would be employed in conjunction with a constant current of about 100 milliamperes to operate the circuit suitably for magnetic recording. In such case, about one watt of power must be handled and dissipated by each transistor when switched on. This high dissipation requirement does not permit the use of integrated circuitry, and tends to limit the switching speeds.

Figure 2A:
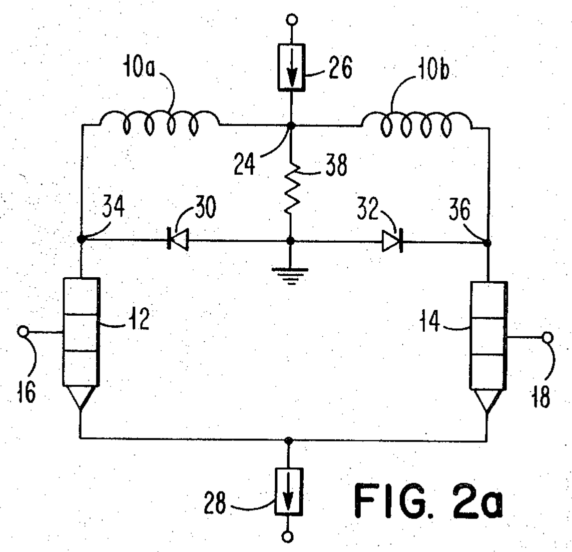
FIG. 2*a* is a schematic circuit diagram of a circuit made in accordance with this invention.
Figure 2B:
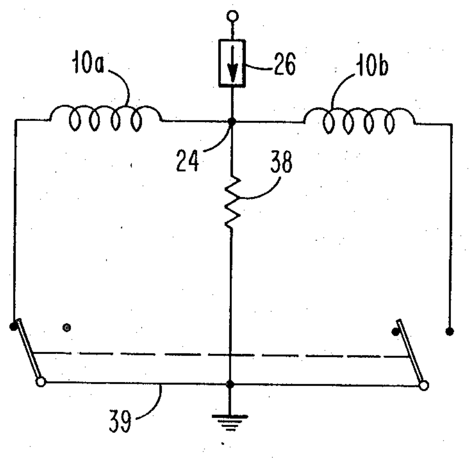
FIG. 2*b* is an idealized circuit of FIG. 2*a;*.
Figure 3:
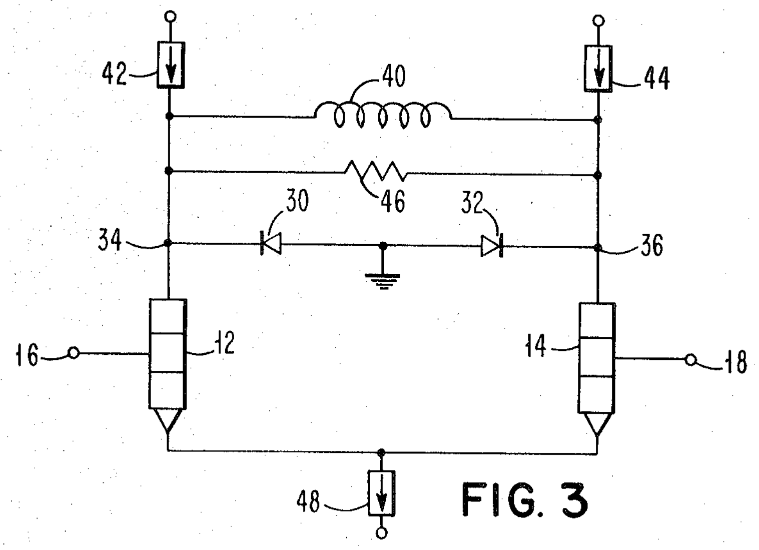
FIG. 3 is a schematic diagram of an alternative embodiment of the invention.

To overcome the problems presented by the prior art circuits, applicant is disclosing a novel circuit configuration wherein a constant current source is applied to the coil means 10 instead of a bias voltage as depicted in FIGS. 2 and 3.

In FIG. 2*a*, which presents a current switch circuit as taught by the instant invention, a first constant current source 26 is applied to the center tap 24 of the coil 10. In addition, a second constant current source 28, of a higher magnitude than the first current source, is connected between the emitter circuits of the transistors 12 and 14.

During operation, logic trigger signals are applied alternately to the base electrodes of the transistors 16 and 18 to develop switching signals or pulses. When either transistor is conducting, current flows through a path including the current source 26, the coil portion 10*a* or 10*b*, the energized transistor, and the second current source 28. A diode 30 or 32 serves to clamp the terminal 34 or 36 between the collector electrode and the coil at a fixed voltage. The diodes are so poled as to prevent current flow in the circuit leg of the inactive transistor. The voltage level of the trigger signal to the conducting transistor is set so as to just preclude saturation of that transistor.

A damping resistor 38 is connected between the constant current source 26 and a source of reference potential, such as ground, with the grounded end of the resistor coupled to the junction between the anodes of the diodes. The resistor 38 damps undesirable transients, and prevents overshoot and resulting oversaturation of the recording medium.

With the arrangement of FIG. 2*a*, one circuit leg is clamped to a reference voltage at the junction between the collector electrode and the coil 10, which is connected to the cathode of the associated diode 34 or 36. In this way, power dissipation is transferred from the transistor switches to the current source 26, which is fed to ground. By way of example, the power dissipation level of the switch transistors is reduced to approximately 70 milliwatts as compared to the 1 watt power dissipation of the prior art circuit, because collector-to-emitter voltage is now about 0.7 volts, as contrasted to the 10 volts utilized by the prior art circuits.

The circuit of FIG. 2*a* lends itself to fabrication by integration processes so that magnetic heads and the head driver circuits, including the preamplifier, may be made by printed circuit technology. Shorter conductive leads may be used, thereby reducing the susceptibility to stray capacitance, with resultant cleaner signal waveforms and improved recording performance. The lower power dissipation through the transistor switches precludes the need for heat sinks and the like.

With this configuration, write driver base current need not be supplied by the write current source, and therefore a major component of write current variation as a function of temperature or other variables is negated. Also, only a single connection to a magnetic head coil is required for damping. Additionally, write current may be conducted to the heads over relatively long lines without serious degradation.

FIG. 2*b* shows an idealized version of the circuit of FIG. 2*a*, and illustrates a switch 39 representing the transistor circuit of FIG. 2*a*.

An alternative configuration of the inventive circuit is shown in FIG. 3, wherein a single coil 40 is employed with separate constant current sources 42 and 44 applied respectively to each end of the coil 40. A damping resistor 46 is coupled to the ends of the coil 40. The constant current source 48 is of a magnitude greater than the added currents of sources 42 and 44. This geometry is particularly advantageous for printed head applications where use of a center tap is not feasible.

There has been disclosed herein a novel switching circuit, having inductive means, that is particularly useful as a magnetic head driver, among other things. The circuit is characterized by much lower power dissipation than previously used head driver and switching circuits, and lends itself to integrated circuit manufacture with resultant reduced cost and compactness.

What is claimed is:

1. A current switching circuit comprising:

an inductive coil means, one end of said coil means connected to one branch of said circuit, and the other end of said coil means connected to a second branch of said circuit, said branches having substantially the same configuration;

a first current source means for providing a constant current coupled to said coil means;

first and second switching elements respectively connected in each branch to said coil means;

a source of reference potential;

means for coupling said switching elements to said source of reference potential;

second current source means coupled between said switching elements for providing a constant current of greater magnitude than said first constant current source means; and means for activating said switching elements in alternation to develop current flow alternately in said circuit branches.

2. A switching circuit as in claim 1, wherein said inductive coil means comprises a center-tapped coil, said first current source being applied to the center tap of said coil.

3. A switching circuit as in claim 1, wherein said switching elements are transistors; and said activating means comprises logic trigger signal means that are applied to the bases of said transistors.

4. A switching circuit as in claim 3, including unilateral conducting devices coupled between said transistors, so that when current flows in one circuit branch, the other circuit branch is non-conductive.

5. A switching circuit as in claim 4, wherein said unilateral conducting devices are clamping diodes.

6. A switching circuit as in claim 3, wherein the collector electrodes of said transistors are connected to the ends of said coil means, and the emitter electrodes of said transistors are connected to said second constant current source.

7. A switching circuit as in claim 1, including a damping resistance means coupled between said first constant current source and a reference voltage means.

8. A switching circuit as in claim 1, wherein said coil means comprises a single coil, and said first constant current source means comprises separate current sources that are applied respectively to the ends of said coil.

9. A switching circuit as in claim 1, wherein said coil means is part of a magnetic head write driver circuit.

* * * * *